July 28, 1959
K. T. LARKIN
2,897,449
ANTI-IMAGE DEVICES
Filed Nov. 12, 1954
2 Sheets-Sheet 2
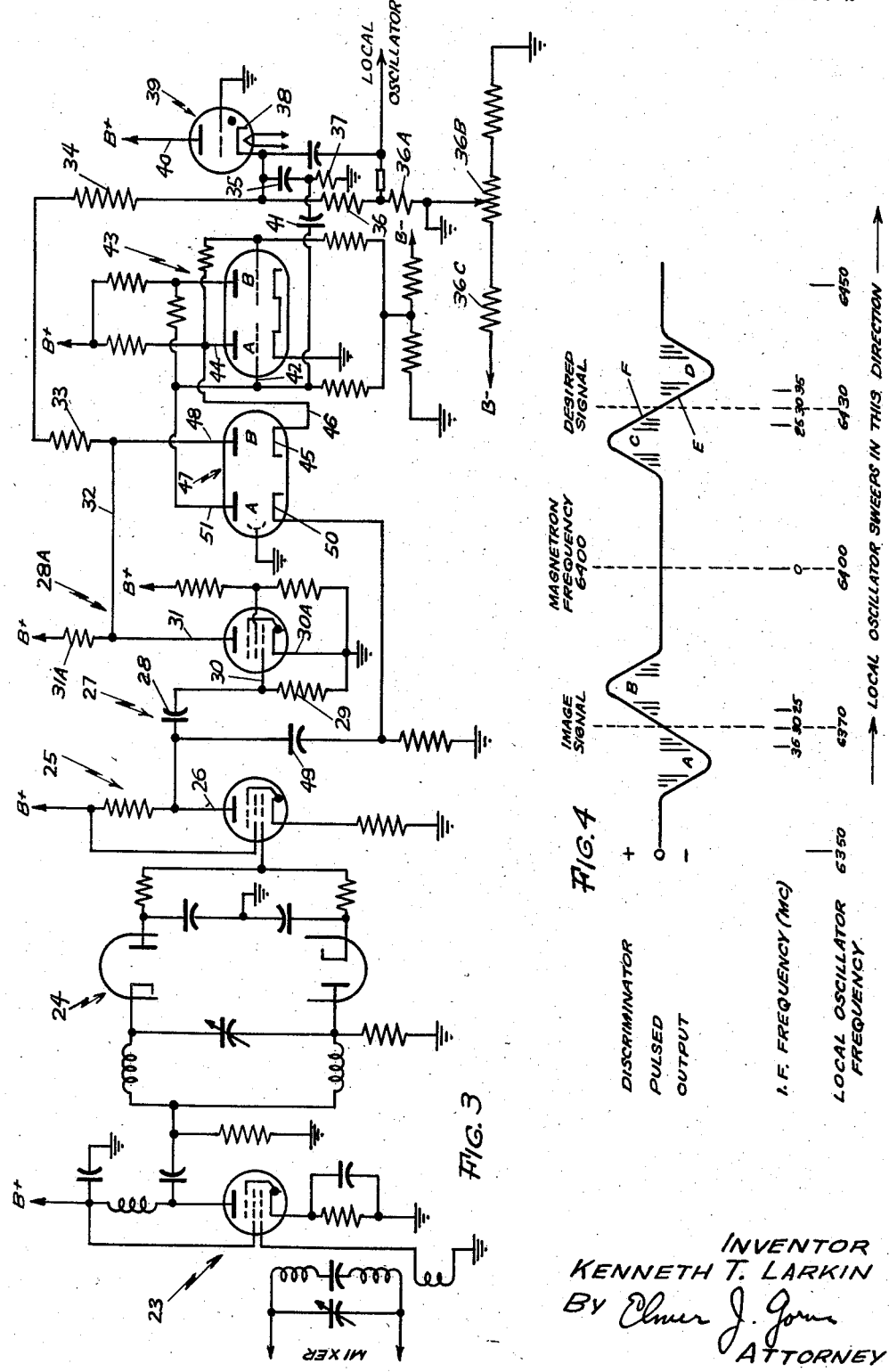
INVENTOR
KENNETH T. LARKIN
BY
ATTORNEY United States Patent Office 2,897,449
Patented July 28, 1959

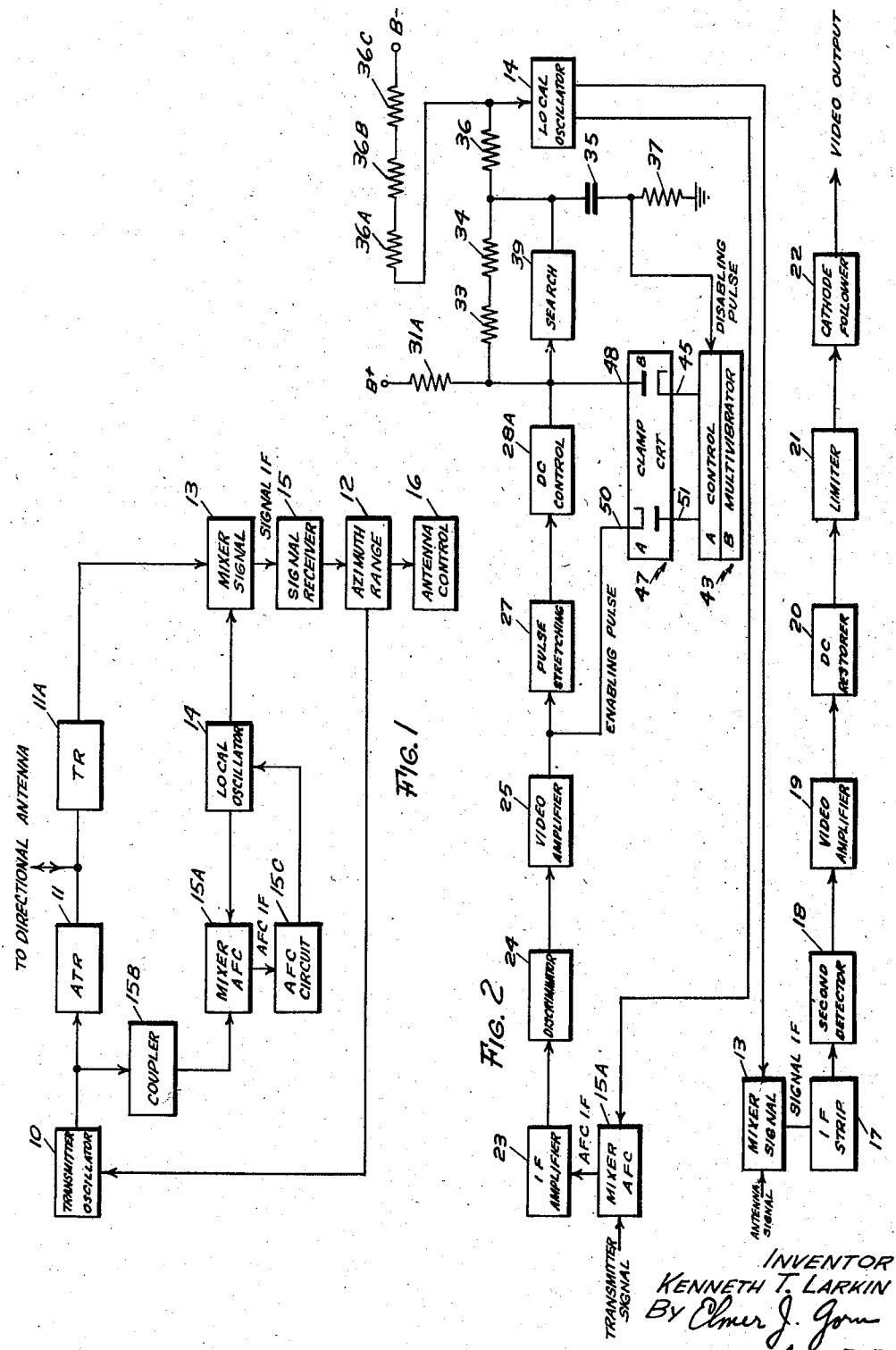

2,897,449

ANTI-IMAGE DEVICES

Kenneth T. Larkin, Wayland, Mass., assignor to Raytheon Manufacturing Company, Waltham, Mass., a corporation of Delaware Application November 12, 1954, Serial No. 468,355

7 Claims. (Cl. 331—4)

This invention relates to an anti-image device for use in a radar system. More specifically, this invention discloses a system wherein the local oscillator of a superheterodyne receiver is prevented from locking in on the undesired image oscillator frequency.

Automatic frequency control systems have been commonly used in radar receivers to maintain the difference or intermediate frequency between the local oscillator and the carrier frequency. Heretofore if the intermediate frequency were changed by any amount, the local oscillator would search the frequency spectrum and lock in on the newly found intermediate frequency. It was, therefore, a matter of chance as to whether the local oscillator would lock in on the undesired image frequency which is below the carrier frequency, or whether the local oscillator would lock in on the desired frequency, which is higher than the carrier frequency.

The present invention is concerned with an anti-image circuit that works in conjunction with an automatic searching circuit that sweeps the frequency spectrum if the intermediate frequency is lost for any reason. In sweeping, the anti-image circuit prevents the local oscillator from locking in on the undesired image frequency.

An object of this invention is to disclose an anti-image circuit for any heterodyne application that will prevent the local oscillator from locking in on any undesirable image frequency. Another object of this invention is to accomplish the aforesaid in a cheap and reliable manner.

Further objects and advantages of this system will be apparent as the disclosure progresses, reference being made to the accompanying drawings, wherein:

Fig. 1 is a block diagram of a radar system;

Fig. 2 is a block diagram of the radar receiver in Fig. 1 illustrating an embodiment of this invention;

Fig. 3 is a schematic drawing of the automatic frequency control circuit illustrating an embodiment of this invention; and Fig. 4 is a drawing of the output of the automatic frequency control discriminator.

Referring now to Fig. 1, there is shown a block diagram of a complete radar system. The over-all radar system is conventional in that the transmitter is composed of a magnetron oscillator 10 delivering power to a directional antenna through a protective ATR device 11. An azimuth range indicator 12 serves as a control center for the entire system in that a trigger pulse from the azimuth range indicator 12 is used to fire the magnetron oscillator 10, thereby insuring that indicated zero time occurs when the magnetron oscillator 10 fires. When the transmitted signal strikes a target, a small portion of the energy is reflected back to the directional antenna through the TR device 11A to mixer 13. The ATR device 11 and the TR device 11A act as an automatic electronic switch connecting mixer 13 to the antenna, while the transmitter 10 is off, and isolating the mixer 13 from the antenna while the transmitter is on. A local oscillator 14 beats with the incoming signal from the antenna in mixer 13 producing an intermediate frequency signal of 30 megacycles that is amplified in receiver 15. The automatic frequency control circuit consists of a separate mixer 15A that is impulsed from the transmitter oscillator 10 through coupler 15B. The local oscillator 14 heterodynes with the transmitted frequency in mixer 15A to produce an intermediate frequency that is fed to an automatic frequency control circuit 15C which, in turn, is fed back to the local oscillator 14 for controlling its frequency. It can be seen, therefore, that the combination of mixer 13, local oscillator 14, signal receiver 15, AFC mixer 15A and AFC circuit 15C form a basic superheterodyne receiver wherein the frequency of local oscillator 14 is varied to maintain a constant intermediate frequency. The radar system actually produces two separate IF strips both tuned to 30 megacycles, the only difference being in their function in that the signal IF strip after being amplified and detected by receiver 15 is fed into the azimuth range indicator 12 as a video signal for indication of the target. The second IF strip is called the automatic frequency control strip, which will henceforth be called AFC, and is the subject of this invention in that this signal is fed back to the local oscillator 14 for tuning said oscillator, thereby keeping both IF frequencies constant. The subject matter of this invention lies in the AFC circuit 15C for tuning the local oscillator 14. The AFC circuit 15C prevents the local oscillator 14 from locking in on the undesired image frequency. Antenna control 16 determines the direction that the directional antenna is pointing and feeds this information into the azimuth range indicator 12.

Automatic frequency control systems have been employed in radar receivers to maintain the difference frequency between the local oscillator and the transmitter magnetron oscillator. The problem exists in these systems since the desired oscillator frequency that is produced can be either higher or lower than the magnetron frequency, and it is therefore possible for an AFC circuit to lock on either of these frequencies. For systems having the oscillator frequency on the high side of the magnetron oscillator, improper operation would occur if the AFC circuit locked on the low side. The circuitry disclosed in this invention precludes the possibility of having the local oscillator tuned so as to produce an intermediate frequency on the low side of the magnetron frequency.

Referring now to Fig. 2, there is shown mixer 13 feeding the signal intermediate frequency into a six-stage signal IF strip 17, which, in turn, feeds second detector 18. It will be noted that the video signal strip is conventional in block layout in that second detector 18 drives a video amplifier 19, which feeds a D.C. restorer 20 feeding a limiter 21, which, in turn, feeds a cathode follower 22. The video output signal from cathode follower 22 is fed into the azimuth range indicator 12.

Mixer 15A feeds the AFC intermediate frequency to IF amplifier 23. The balance of the AFC circuit is shown in schematic form in Fig. 3 and reference should be made thereto. IF amplifier 23 is a conventional pentode type RF amplifier, the output of which is coupled to a discriminator stage 24. The discriminator stage 24 is a modified Wiess discriminator circuit designed to give a zero voltage output when the IF frequency is equal to 30 megacycles, a negative D.C. voltage output if the IF frequency is greater than 30 megacycles and a positive D.C. voltage output for frequencies less than 30 megacycles. By referring now to Fig. 4, which is a drawing of the output voltages from discriminator 24 versus frequency, it will be shown how this principle is used to prevent the local oscillator 14 from locking it on an image frequency. The output of discriminator 24 feeds a video amplifier 25, which is a standard pentode amplifier.

Under normal operating conditions wherein local oscillator 14 is operating at the correct frequency, thereby giving a frequency which is 30 megacycles above the carrier frequency, it can be seen by referring to Figs. 2 and 3 that plate 26 is connected to a pulse stretching stage 27 consisting of capacitor 28 and resistor 29 connected in series. One end of resistor 29 is grounded and the output of said pulse stretching stage 27 is fed from a point intermediate capacitor 28 and resistor 29 to the grid 30 of a D.C. control stage 28A. Under normal operating conditions imposed, the local oscillator 14 will operate at approximately point E as shown in Fig. 4. Since the local oscillator 14 is operating in region D, the output of discriminator 24 will consist of a series of negative D.C. pulses occurring at the system repetition rate as shown in Fig. 4. This negative potential is reversed 180° in video amplifier 25, thereby becoming positive pulses at plate 26. These positive pulses at plate 26 also occur at the repetition rate of the system. In order to convert these positive pulses into an operating voltage, the time constant of capacitor 28 and resistor 29 is chosen to be sufficiently high so that capacitor 28, which is charged by these repetitious positive pulses, is allowed to maintain its charge between pulses, thereby obtaining its name as a pulse stretcher.

Capacitor 28 is charged by drawing grid current from grid 30 of the video amplifier stage 25. In other words, the circuit from cathode 30A to grid 30 of the D.C. control stage 28A acts as a charging diode for capacitor 28. This charging action takes place on the positive pulses only. During the interval between pulses, capacitor 28 discharges through resistor 29, thereby biasing the D.C. control stage 28A. The amount of bias is determined by the charged voltage on capacitor 28 which, in turn, depends upon the magnitude of the repetition pulses as shown in Fig. 4. This changing bias voltage at grid 30 causes a changing output voltage at plate 31 due to the changing plate current flowing through resistor 31A. Resistor 31A is connected to plate 31 at one end and a positive voltage source at the other end. Resistor 31A is also part of a bleeder circuit that is connected at a point intermediate resistor 31A and plate 31 by wire 32 to the series combination of resistors 33 and 34 to a junction point with capacitor 35. Connected to said junction is the series combination of resistor 36, 36A, 36B and 36C. The other end of resistor 36C is connected to a negative potential, thereby completing the bleeder circuit. Connected intermediate resistor 36 and 36A is a junction at which point the repeller voltage for changing the frequency of local oscillator 14 is tapped off. The changing voltage at plate 31 that is caused by the changing bias on grid 30 causes the frequency of local oscillator 14 to change. This changing voltage has the effect of lowering the frequency of local oscillator 14, which is the desired result since it was previously stated that the intermediate frequency was at a point E, as shown in Fig. 4, which is a point slightly higher than the normal operating point.

If, for any reason at all, the AFC IF frequency is lost, which could occur due to the transmitter oscillator 10 missing a series of pulses, or for any situation whatsoever wherein a transient condition causes the loss of the IF frequency, the AFC circuit will cause a search of the frequency spectrum in order to locate the new correct IF frequency. Under the normal operating conditions previously explained, capacitor 35 slowly charges and discharges in an effort to follow the varying voltage at plate 31. It is apparent that, under normal operating conditions, if the IF frequency had moved to point F, as shown in Fig. 4, a positive pulse would be available at plate 31, thereby raising the local oscillator frequency. Capacitor 35 is therefore charged and discharged by this changing voltage at plate 31 in accordance with the changing IF frequency.

If the IF frequency were lost, capacitor 35, which is also connected to resistor 37, which in turn is connected to ground, will discharge until a critical point is reached wherein cathode 38, which is connected to the junction point of capacitor 35 and resistors 34 and 36, will cause the firing of search tube 39. The firing of search tube 39 will cause capacitor 35 to charge from ground through resistor 37 to and through capacitor 35 and thence to cathode 38 to plate 40 and then to B+. The firing of tube 39 and the consequent charging of capacitor 35 causes a positive pulse of current through resistor 37, which is applied by capacitor 41, which is connected intermediate resistor 37 and capacitor 35, to grid 42, which is the A section of control multivibrator 43. This positive pulse causes the A section of control multivibrator 43 to conduct, which in turn causes section B of multivibrator 43, which is normally conducting, to stop. This control multivibrator 43 is of the bistable type in that it is triggered into one state of operation by the initiation of a pulse and will maintain this condition until another operating pulse is received. As soon as the A section of control multivibrator 43 fires, the plate voltage on plate 44 is lowered, causing a low potential to appear on cathode 45, which is connected by wire 46 to plate 44. Cathode 45 is the B section of a clamping circuit 47. This lowered voltage on cathode 45 causes the B section of clamping circuit 47 to conduct, thereby causing a lowered plate voltage to appear on plate 48. This lowered plate voltage also appears on plate 31 of the D.C. control stage 28A, since plate 31 and plate 48 are directly connected together by wire 32. This action of imposing a lowered plate voltage on plate 31 has the effect of cancelling out any further information that might come through the IF stage 23, discriminator stage 24, and video amplifier stage 25. In effect, the AFC circuit has been disabled preparatory to a searching operation. The positive pulse from resistor 37 is, therefore, being called a disabling pulse.

This disabling action occurs instantaneously during the initial charge of current going through capacitor 35. Capacitor 35, upon being fully charged, thereby raises the cathode voltage on cathode 38, causing the search tube 39 to cease firing. This high negative voltage appearing on capacitor 35 causes the local oscillator to lower its frequency to its lowest possible operating point at which point the search will begin to sweep from low to high frequency, as illustrated in Fig. 4. All voltages on the other tubes will now remain constant until some other information is fed to them to cause a change. The charging time of capacitor 35 has purposely been made very short in order to prevent the AFC circuit from operating on any information it receives during the charging cycle.

Referring now to Fig. 4, the discharging of capacitor 35 will cause the voltage to local oscillator 14 to vary from a more negative to a less negative condition, thereby causing local oscillator 14 to vary in frequency beginning at the low order end and proceeding first past region A. Region A having a higher IF frequency than 30 megacycles will cause the discriminator stage 24 to deliver a series of negative D.C. pulses to the video amplifier stage 25. This negative input to the video amplifier 25 becomes a positive output at plate 26, causing grid 30 to draw grid current, thereby charging capacitor 28. When the pulse is passed, capacitor 28 discharges through resistor 29 to ground, which biases the D.C. control tube 28A. This bias depends on the amplitude of the pulses that are controlled by the frequency signal being fed to the AFC circuit. Normally, the voltage on plate 31 would rise except that section B of the clamp circuit 47 is now conducting, thereby maintaining the plate voltage on both plates 31 and 48 at a very low value. The time constant in the grid circuit of the D.C. control 28A is sufficiently large as compared with the pulse of the repetition rate to hold grid 30 at a constant value between the pulses generated when the transmitter oscillator 10 is fired. This is the action of pulse-stretching stage 27.

As the local oscillator 14 sweeps into region B, the discriminator stage 24 has an output of positive pulses.

These positive pulses at the input of video amplifier 25 become negative pulses at the output, which is plate 26. These negative pulses are coupled through a coupling capacitor 49, one end of which is connected to plate 26, the other end of which is connected to cathode 50 of the A section of the clamp circuit 47. These negative pulses from plate 26 appear on cathode 50 and are low enough in magnitude to cause the firing of the A section of clamping circuit 47. This negative pulse at plate 26 is therefore available at plate 51, which in turn is impressed on grid 42 of the A section of multivibrator 43, since plate 51 is connected to grid 42. This negative pulse is called the enabling pulse since it appears on grid 42 causing the A section of control multivibrator 43 to stop firing, thereby causing section B of said control multivibrator 43 to begin firing. The plate voltage on plate 44, therefore, rises to its B+ value, thereby causing section B of clamping diode 47 to stop conducting, since its cathode voltage now rises to B+. Since section B of clamping circuit 47 has ceased to conduct, the plate voltage on plate 48 is no longer held to any low value, but is now free to rise to a B+ value, or to any other value as controlled by plate 26 of video amplifier stage 25.

The searching action of local oscillator 14 still continues until region C is reached, as shown in Fig. 4. As local oscillator 14 passes through region C, negative pulses will appear at plate 26 of video amplifier stage 25 as already explained for region B. Between pulses, capacitor 28 will discharge through resistor 29 which biases the D.C. control stage 28A, thereby causing the voltage on plate 31 to follow the AFC IF signal. There is no other effect at this time except that capacitor 35 continues to discharge causing a sweep into region D.

As local oscillator 14 sweeps into region D, as shown in Fig. 4, the output of the discriminator stage 24 is again a series of negative pulses. These negative pulses become positive pulses at plate 26 of the video amplifier stage 25 causing capacitor 28 to charge as previously described, which provides an average bias for grid 30. Plate 31, therefore, rises to a D.C. value as determined by the grid voltage. This rising D.C. voltage on plate 31 is not held down by plate 48 of clamping voltage 47. This changing voltage in plate 31 is fed through wire 32 to and through resistors 33 and 34 in series to a junction point of capacitor 35 to and through resistor 36 and thence to local oscillator 14. This changing voltage has the effect of both increasing the local oscillator frequency, which is the desired direction at this point, and stopping the discharge of capacitor 35. It can be seen, therefore, that region D has the effect of bringing the AFC circuit in line with the voltage of capacitor 35. Resistor 33 and 34 have a sufficiently high value to prevent any appreciable charging of capacitor 35. Therefore, at this point, the discharge of capacitor 35 is stopped and made to follow the voltage variations on plate 31. The local oscillator 14 is now locked on the desired signal and since the average bias on grid 30 of the D.C. control stage 28A varies slightly with drift, temperature, etc., the D.C. value on plate 31 varies a corresponding amount, which in turn varies the repeller voltage of the local oscillator a corresponding amount. This keeps the local oscillator locked well within the band pass of the IF amplifier.

If, for some reason, the transmitter oscillator 10 stops firing or misses several pulses, capacitor 35 will start discharging again, and if the transmitter oscillator 10 does not start firing on its desired frequency before search tube 39 fires, then the search tube 39 will fire and the entire process of locking on the desired signal will start all over again.

If, for some reason, the local oscillator 14 has passed through the image frequency, or due to other circumstances, the local oscillator 14 does not tune through the image signal, the local oscillator 14 can still lock on the desired signal provided that positive pulses are received from the discriminator at region C in Fig. 4. For the circuit to lock, it is only necessary that a positive enabling pulse be generated before the local oscillator has passed through the desired frequency.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

What is claimed is:

1. In combination, a first frequency source for producing a plurality of frequencies, a second frequency source for producing a plurality of frequencies, means for heterodyning said first frequency source and said second frequency source for producing a beat frequency, a voltage producing means for producing a negative voltage output for a high variation of said beat frequency and a positive voltage output for a low variation of said beat frequency, a first capacitor having means for being charged and discharged by the variations of said voltage producing means, means for utilizing the voltage on said first capacitor for controlling the frequency of said second frequency source, a bistable multi-vibrator having an A and B section wherein the B section is normally conducting, a second capacitor having means for being charged and discharged, means for charging said second capacitor whereby a voltage is produced for triggering said multi-vibrator thereby causing the A section to conduct, a first clamping means connected to the A section of said multi-vibrator for preventing an output pulse from the voltage producing means whenever the A section of said multi-vibrator conducts, means for discharging said second capacitor to cause the frequency range of said second frequency source to vary through a range of frequencies including undesired image frequencies in such a sense as to cause said beat frequency to vary from a first value through zero and then to a second value, and a second clamping means for allowing any positive voltage from said voltage producing means to cause the B section of said multi-vibrator to conduct thereby conditioning the circuit for the arrival of a negative voltage from said voltage producing means that will stop the discharge of said second capacitor thereby causing the sweep of said second frequency source to stop and the circuit to stabilize.

2. In combination, a first frequency source for producing a plurality of frequencies, a second frequency source for producing a plurality of frequencies, means for heterodyning said first frequency source and said second frequency source for producing a beat frequency, a discriminator for producing a negative voltage output for a high variation of said fixed frequency and a positive voltage output for a low variation of said fixed frequency, a first capacitor having means for being charged and discharged by the variations of said voltage producing means, means for utilizing the voltage on said first capacitor for controlling the frequency of said second frequency source, a bistable multi-vibrator having an A and B section wherein the B section is normally conducting, a second capacitor having means for being charged and discharged, means for charging said second capacitor whereby a voltage is produced for triggering said multi-vibrator causing the A section to conduct, a first diode connected to the A section of said multi-vibrator for preventing any output pulse from the discriminator whenever the A section of said multi-vibrator conducts, means for discharging said second capacitor for sweeping said second frequency source through a range of frequencies including undesired image frequencies in such a sense as to cause said beat frequency to vary from a first value through zero and then to a second value, and a second diode for allowing any positive voltage from said discriminator to cause the B section of said multi-vibrator to conduct thereby conditioning the circuit for the arrival of a negative pulse from said discriminator that will stop the discharge of said second capacitor thereby causing the sweep to stop and the circuit to stabilize.

3. In combination, a first frequency source for generating a plurality of frequencies, a second frequency source for generating a plurality of frequencies, heterodyning means connected to said first and second frequency sources for producing a beat frequency, control means responsive to said beat frequency for controlling the frequency of said second source whereby said beat frequency is maintained at a predetermined value, disabling means including charging and discharging means for disabling said control means when said beat frequency is lost and for varying the frequency of said second frequency source through a range of frequencies such that said beat frequency varies successively through a first range of values, through zero, and through a second range of values after said control means are disabled, means for reactuating said control means as said beat frequency is varied through said first range of values whereby said control means operates to maintain said beat frequency at said predetermined value as said beat frequency is varied through said second range of values.

4. In combination, a first frequency source for generating a plurality of frequencies, a second frequency source for generating a plurality of frequencies, a heterodyning means connected to said first and second frequency sources for producing a beat frequency, control means responsive to said beat frequency for controlling the frequency of said second source whereby said beat frequency is maintained at a predetermined value, storage means, means for charging said storage means when said beat frequency is lost, means responsive to said charged storage means for disabling said control means, means for discharging said storage means whereby the frequency of said second frequency source is varied through a range of frequencies such that said beat frequency varies successively through a first range of values, through zero, and through a second range of values, means responsive to said variation of said beat frequency through said first range of values for reactuating said control means, said control means thereby being responsive to said variation of said beat frequency within said second range of values for maintaining said beat frequency at said predetermined value.

5. In combination, a first frequency source for generating a plurality of frequencies, a second frequency source for generating a plurality of frequencies, heterodyning means connected to said first and second frequency sources for producing a beat frequency, control means responsive to said beat frequency for controlling the frequency of said second source whereby said beat frequency is maintained at a predetermined value, capacitance means, means for charging said capacitance means when said beat frequency is lost, means responsive to said charged capacitance means for disabling said control means, means for discharging said capacitance means whereby the frequency of said second frequency source is varied through a range of frequencies such that said beat frequency varies successively through a first range of values, through zero, and through a second range of values, means responsive to said variation of said beat frequency through said first range of values for reactuating said control means, said control means thereby being responsive to said variation of said beat frequency within said second range of values for maintaining said beat frequency at said predetermined value.

6. In combination, a first frequency source for generating a plurality of frequencies, a second frequency source for generating a plurality of frequencies, heterodyning means connected to said first and second frequency sources for producing a beat frequency, control means responsive to said beat frequency for controlling the frequency of said second source whereby said beat frequency is maintained at a predetermined value, capacitance means, means for charging said capacitance means when said beat frequency is lost, means responsive to said charged capacitance means for disabling said control means, means for discharging said capacitance means whereby the frequency of said second frequency source is varied through a range of frequencies such that said beat frequency varies successively through a first range of values including an undesired image beat frequency and through a second range of values including said predetermined value of said beat frequency, means responsive to said variation of said beat frequency through said first range of values for reactuating said control means, said control means thereby being responsive to said variation of said beat frequency within said second range of values for maintaining said beat frequency at said predetermined value.

7. In combination, a first frequency source for generating a plurality of frequencies, a second frequency source for generating a plurality of frequencies, heterodyning means connected to said first and second frequency sources for producing a beat frequency, control means including voltage-producing means responsive to said beat frequency for producing a negative voltage output for a high variation of said beat frequency and a positive voltage output for a low variation of said beat frequency, and a biasing means for controlling the frequency of said second source in response to said voltage producing means whereby said beat frequency is maintained at a predetermined value, a capacitance means, means for charging said capacitance means when said beat frequency is lost, means responsive to said charged capacitance means for disabling said control means, means for disabling said control means, means for discharging said capacitance means whereby the frequency of said second frequency source is varied through a range of frequencies such that said beat frequency varies successively through a first range of values from a high value to a lower value, through zero and then through a second range of values from a low value to a higher value, means responsive to said variation of said beat frequency through said low value of said first range of values for reactuating said control means, said control means thereby being responsive to said variation of said beat frequency within said second range of values for maintaining said beat frequency at said predetermined value.

References Cited in the file of this patent

UNITED STATES PATENTS

| 2,434,294 | Ginzton | Jan. 13, 1948 |
| 2,555,175 | Whitford | May 29, 1951 |
| 2,558,435 | Hollingsworth | June 26, 1951 |
| 2,562,304 | Durand et al. | July 31, 1951 |
| 2,594,263 | Munster | Apr. 22, 1952 |

FOREIGN PATENTS

| 641,891 | Great Britain | Aug. 23, 1950 |
| 641,900 | Great Britain | Aug. 23, 1950 |